US012313941B2

(12) United States Patent
Zhang et al.

(10) Patent No.: US 12,313,941 B2
(45) Date of Patent: May 27, 2025

(54) LIQUID CRYSTAL LIGHT-CONTROL PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yadong Zhang, Beijing (CN); Bo Wu, Beijing (CN); Ting Li, Beijing (CN); Biqi Li, Beijing (CN); Jing Han, Beijing (CN); Haohao Li, Beijing (CN); Changyi Wang, Beijing (CN); Zhengdong Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,386

(22) PCT Filed: Jun. 30, 2022

(86) PCT No.: PCT/CN2022/102838
§ 371 (c)(1),
(2) Date: Mar. 21, 2023

(87) PCT Pub. No.: WO2024/000410
PCT Pub. Date: Jan. 4, 2024

(65) Prior Publication Data
US 2024/0319544 A1 Sep. 26, 2024

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133357* (2021.01); *G02F 1/133512* (2013.01);
(Continued)

(58) Field of Classification Search
CPC .... G02F 1/13394; G02F 1/161; G02F 1/0107; G02F 1/1339; G02F 1/13392;
(Continued)

(56) References Cited

U.S. PATENT DOCUMENTS 5,032,536 A * 7/1991 Oritsuki .............. H01L 27/1288
257/E21.414
11,211,012 B2 12/2021 Hao et al.
(Continued)

FOREIGN PATENT DOCUMENTS

CN 202837748 U 3/2013
CN 104040415 A 9/2014
(Continued)

*Primary Examiner* — Hoan C Nguyen
(74) *Attorney, Agent, or Firm* — XSENSUS LLP (57) ABSTRACT

A liquid crystal light-control panel includes a first array substrate and a cover plate opposite to each other, and a plurality of support pillars disposed between the first array substrate and the cover plate. The first array substrate includes a first substrate and a plurality of transistors disposed on the first substrate. The cover plate includes a second substrate and a light-shielding layer, including a plurality of first light-shielding blocks in one-to-one correspondence with the plurality of support pillars and a plurality of second light-shielding blocks in one-to-one correspondence with the plurality of transistors, disposed on the second substrate. An orthographic projection of the support pillar onto the first substrate is within an orthographic projection of the corresponding first light-shielding block onto the first substrate. An orthographic projection of the transistor onto the first substrate is within an orthographic projection of the (Continued)

projection of the corresponding second light-shielding block onto the first substrate.

20 Claims, 4 Drawing Sheets

(51) Int. Cl.
  *G02F 1/1335* (2006.01)
  *G02F 1/1343* (2006.01)
  *G02F 1/1362* (2006.01)
  *G02F 1/1368* (2006.01)
(52) U.S. Cl.
  CPC .... *G02F 1/13398* (2021.01); *G02F 1/134309* (2013.01); *G02F 1/136286* (2013.01); *G02F 1/1368* (2013.01)
(58) Field of Classification Search
  CPC ............ G02F 1/13396; G02F 1/13398; G02F 1/1679; G02F 1/1343; G02F 1/134309; G02F 1/134318; G02F 1/134336; G02F 1/136286; G02F 1/1368; G02F 1/133357; G02F 1/133345; G02F 1/16756; G02F 1/1336; G02F 1/133601; G02F 1/133512; G02F 1/136209; G02F 1/1351; G02F 1/1352; G02F 1/155; G02F 2001/1555; G02F 1/1357; G02F 1/136227; G02F 2001/1635; G02F 1/0105; G02F 1/133707; G02F 1/13471
  See application file for complete search history.

(56) References Cited

U.S. PATENT DOCUMENTS

| | | | |
|---|---|---|---|
| 2004/0233378 A1* | 11/2004 | Okamoto | G02F 1/13394 349/156 |
| 2005/0140903 A1* | 6/2005 | Park | G02F 1/136286 349/42 |
| 2012/0081641 A1* | 4/2012 | Noh | G02F 1/13394 445/24 |
| 2013/0148045 A1* | 6/2013 | Ohyama | G09G 3/003 349/15 |
| 2014/0347614 A1 | 11/2014 | Asada et al. | |
| 2016/0202530 A1 | 7/2016 | Fang | |
| 2019/0285936 A1* | 9/2019 | Luo | H01L 27/1251 |
| 2020/0292894 A1* | 9/2020 | Liu | G02F 1/13306 |
| 2021/0043147 A1 | 2/2021 | Hao et al. | |
| 2022/0326582 A1* | 10/2022 | Du | G02F 1/134309 |

FOREIGN PATENT DOCUMENTS

| | | | | |
|---|---|---|---|---|
| CN | 105824146 A | | 8/2016 | |
| CN | 107015409 A | * | 8/2017 | ....... G02F 1/133553 |
| CN | 107479257 A | | 12/2017 | |
| CN | 108766327 A | | 11/2018 | |
| CN | 209691758 U | | 11/2019 | |
| CN | 111077712 A | | 4/2020 | |
| CN | 112987357 A | | 6/2021 | |
| CN | 113376904 A | | 9/2021 | |
| CN | 214897561 U | | 11/2021 | |
| JP | 2006030367 A | | 2/2006 | |
| KR | 20070056549 A | * | 6/2007 | |
| KR | 20080002202 A | * | 1/2008 | |
| KR | 20170076185 A | * | 7/2017 | |

* cited by examiner

LIQUID CRYSTAL LIGHT-CONTROL PANEL AND DISPLAY DEVICE

CROSS-REFERENCE TO RELATED APPLICATION

This present disclosure is a U.S. national stage of international application No. PCT/CN2022/102838, field on Jun. 30, 2022, the content of which is herein incorporated by reference in its entirety.

TECHNICAL FIELD

The present disclosure relates to the field of display technologies, and in particular, relates to a liquid crystal light-control panel and a display device.

BACKGROUND OF THE INVENTION

A liquid crystal display (LCD) has advantages of high image quality, small size, light weight, low driving voltage, low power consumption, no radiation, relatively low manufacturing cost, and the like, and thus has been extensively applied to electronic products such as a tablet PC, a TV, a cell phone, and a car monitor.

SUMMARY OF THE INVENTION

Embodiments of the present disclosure provide a liquid crystal light-control panel and a display device with an improved display effect. Technical solutions are described as follows.

According to one aspect of the embodiments of the present disclosure, a liquid crystal light-control panel is provided. The liquid crystal light-control panel includes a first array substrate and a cover plate that are opposite to each other, and a plurality of support pillars disposed between the first array substrate and the cover plate.

The first array substrate includes a first substrate and a plurality of transistors disposed on the first substrate. The cover plate includes a second substrate and a light-shielding layer disposed on the second substrate. The light-shielding layer is provided with a plurality of first light-shielding blocks in one-to-one correspondence with the plurality of support pillars and a plurality of second light-shielding blocks in one-to-one correspondence with the plurality of transistors.

An orthographic projection of the support pillar onto the first substrate is within an orthographic projection of the corresponding first light-shielding block onto the first substrate. An orthographic projection of the transistor onto the first substrate is within an orthographic projection of the corresponding second light-shielding block onto the first substrate. A side face of one of the second light-shielding blocks is attached to a side face of at least one of the first light-shielding blocks.

In some embodiments, the plurality of support pillars are arranged in a plurality of rows. A row of first light-shielding blocks corresponding to a row of the support pillars include a plurality of main light-shielding blocks and a plurality of auxiliary light-shielding blocks.

The plurality of main light-shielding blocks are in one-to-one correspondence with a plurality of second light-shielding blocks in a row of second light-shielding blocks. A side face of the main light-shielding block is attached to a side face of the corresponding second light-shielding block.

In a row of the first light-shielding blocks, at least one of the auxiliary light-shielding blocks is arranged between two adjacent main light-shielding blocks.

In some embodiments, in a row of the first light-shielding blocks, a quantity of the auxiliary light-shielding blocks arranged between two adjacent ones of the main light-shielding blocks is equal.

In some embodiments, in the case that at least two auxiliary light-shielding blocks are arranged between two adjacent ones of the main light-shielding blocks in a row of the first light-shielding blocks, in the at least two auxiliary light-shielding blocks, a center-to-center distance between any two auxiliary light-shielding blocks in a target direction is greater than 0, and the target direction is perpendicular to an overall arrangement direction of the row of first light-shielding blocks.

In some embodiments, a side face of the second light-shielding block is attached to a side face of at least one of the auxiliary light-shielding blocks.

In some embodiments, the first array substrate further includes a common signal line disposed on the first substrate, and a common electrode layer disposed on a side, distal from the substrate, of the plurality of transistors.

A plurality of first via holes are arranged in the first array substrate. The common electrode layer is electrically connected to the plurality of common signal lines via the plurality of first via holes.

The light-shielding layer is further provided with a plurality of third light-shielding blocks in one-to-one correspondence with the plurality of first via holes, and an orthographic projection of the first via hole onto the first substrate is within an orthographic projection of the corresponding third light-shielding block onto the first substrate.

In some embodiments, the first array substrate further includes a plurality of first gate lines and a plurality of first data signal lines disposed on the first substrate. One of the first gate line is electrically connected to a gate electrode of each transistor in a row of transistors, and one of the first data signal lines is electrically connected to a first electrode of each transistor in a column of transistors.

The common signal line and the first data signal line are arranged in the same layer and made of the same material. Orthographic projections of the plurality of first gate lines onto the first substrate are all within an orthographic projection of the light-shielding layer onto the first substrate.

In some embodiments, the first gate line includes a plurality of first sub-gate lines and a plurality of second sub-gate lines. The plurality of first sub-gate lines and the plurality of second sub-gate lines are alternately distributed. A first end of the first sub-gate line is connected to a first end of the second sub-gate line. A second end of the first sub-gate line is connected to a second end of the second sub-gate line. An extension direction of the first sub-gate line is intersected with that of the second sub-gate line.

In some embodiments, an orthographic projection of a portion where the first end of the first sub-gate line and the first end of the second sub-gate line are connected onto the first substrate is overlapped with an orthographic projection of the first light-shielding block onto the first substrate.

An orthographic projection of a portion where the second end of the first sub-gate line and the second end of the second sub-gate line are connected onto the first substrate is overlapped with an orthographic projection of the third light-shielding block onto the first substrate.

In some embodiments, the plurality of first gate lines are in one-to-one correspondence with the plurality of rows of support pillars. The first gate line is provided with a plurality of bumps in one-to-one correspondence with a plurality of support pillars in the corresponding row of support pillars. An orthographic projection of the bump onto the first substrate is within an orthographic projection of the corresponding support pillar onto the first substrate.

In some embodiments, a portion where the first end of the first sub-gate line and the first end of the second sub-gate line are connected is provided with one of the bumps. A quantity of the bumps distributed on each of the first sub-gate line and the second sub-gate line is greater than or equal to 2.

In some embodiments, orthographic projections of the plurality of transistors onto the first substrate and orthographic projections of the plurality of first gate lines onto the first substrate are both within an orthographic projection of the common electrode layer onto the substrate.

In some embodiments, the common electrode layer has a plurality of slits. Orthographic projections of the plurality of slits onto the first substrate are overlapped with neither orthographic projections of the plurality of transistors onto the first substrate nor orthographic projections of the plurality of first gate lines onto the first substrate.

In some embodiments, the first array substrate further includes a plurality of pixel electrodes in one-to-one correspondence with the plurality of transistors. A second electrode of the transistor is electrically connected to the corresponding pixel electrode.

An overlapping region is present between an orthographic projection of the pixel electrode onto the first substrate and an orthographic projection of the common signal line onto the first substrate.

In some embodiments, the pixel electrode and the first gate line are arranged in the same layer but made of different materials.

In some embodiments, the first array substrate further includes a gate insulating layer. A gate electrode of the transistor is disposed on a side, proximal to the first substrate, of the gate insulating layer. A first electrode and a second electrode of the transistor are disposed on a side, distal from the first substrate, of the gate insulating layer.

A plurality of second via holes in one-to-one correspondence with the transistors are arranged in the gate insulating layer. A second electrode of the transistor is electrically connected to the corresponding pixel electrode via the corresponding second via hole.

In some embodiments, the first array substrate further includes a planarization layer between the plurality of transistors and the common electrode layer. The plurality of first via holes are arranged in the planarization layer.

According to another aspect of the embodiments of the present disclosure, a display device is provided. The display device includes a liquid crystal light-control panel and an LCD panel, wherein the liquid crystal light-control panel is the liquid crystal light-control panel described above.

In some embodiments, the liquid crystal light-control panel includes a plurality of light control regions arranged in arrays, the LCD panel has a plurality of sub-pixel regions arranged in arrays, and the light control region and the sub-pixel region are in different shapes.

In some embodiments, the display device further includes a backlight module, and the backlight module is disposed on a side, distal from the LCD panel, of the liquid crystal light-control panel.

BRIEF DESCRIPTION OF DRAWINGS

For clearer descriptions of the technical solutions in the embodiments of the present disclosure, the accompanying drawings required for describing the embodiments are briefly introduced hereinafter. Apparently, the accompanying drawings in the following descriptions show merely some embodiments of the present disclosure, and a person of ordinary skill in the art may still derive other drawings from these accompanying drawings without creative efforts.

DETAILED DESCRIPTION

In order to improve a contrast ratio of the LCD, the LCD can be made by using a display scheme of BD cells. Structurally, the BD cell includes an LCD panel and a liquid crystal light-control panel that are stacked up. The LCD panel is capable of displaying a picture, and the liquid crystal light-control panel is capable of adjusting the brightness of each region according to the picture to be displayed by the LCD panel.

However, at present, the liquid crystal light-control panel has a low light transmittance, leading to a poor display effect of the LCD.

The embodiments of the present disclosure are hereinafter described in further detail with reference to the accompanying drawings, to present the objectives, technical solutions, and advantages of the present disclosure more clearly.

Figure 1:
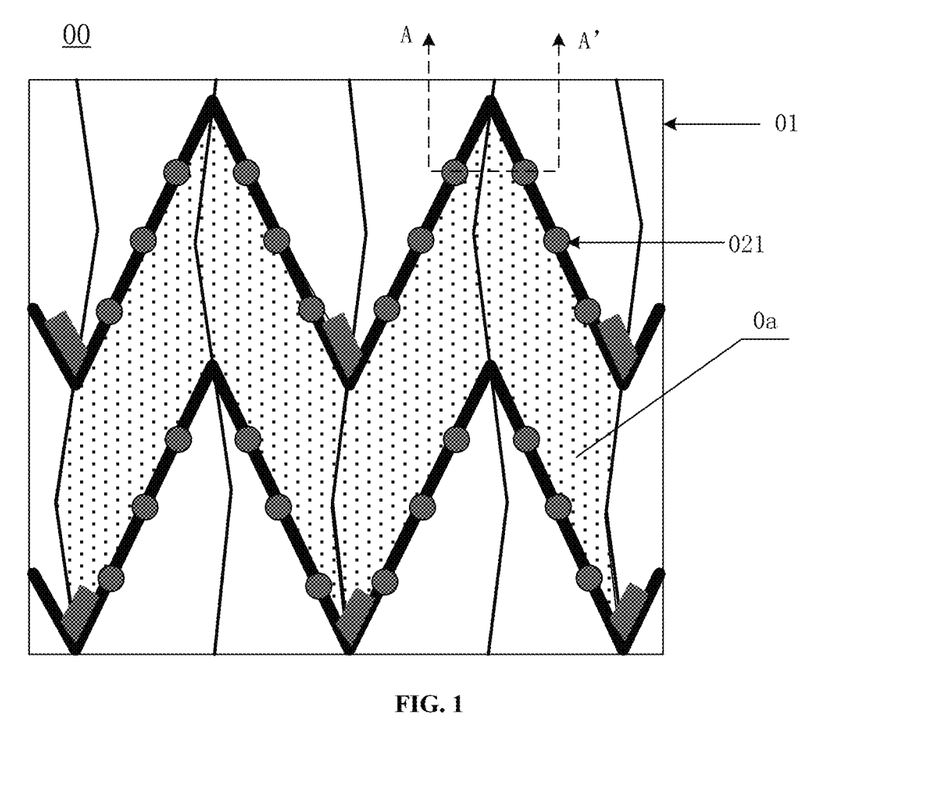
FIG. 1 is an example diagram of a currently common liquid crystal light-control panel.
Figure 2:
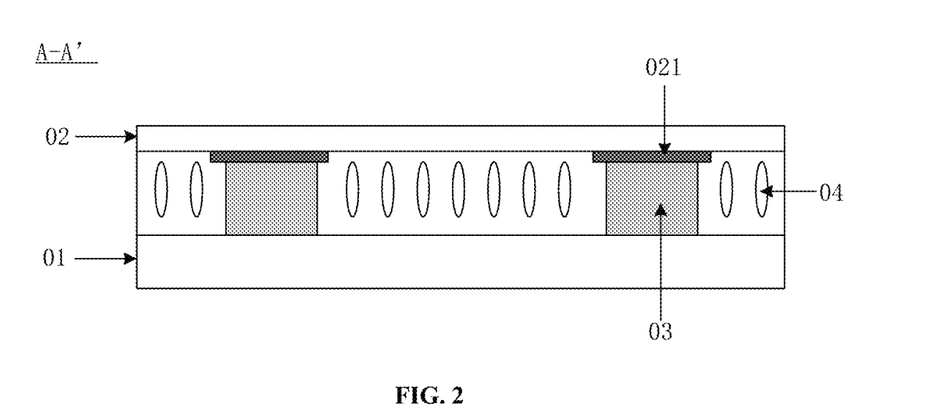
FIG. 2 is a sectional view of the liquid crystal light-control panel shown in FIG. 1 at A-A'.

Referring to FIG. 1 and FIG. 2, in which FIG. 1 is an example diagram of a currently common liquid crystal light-control panel, and FIG. 2 is a sectional view of the liquid crystal light-control panel shown in FIG. 1 at A-A', a liquid crystal light-control panel 00 includes a first array substrate 01 and a cover plate 02 arranged opposite to each other, and a plurality of support pillars 03 and a first liquid crystal layer 04 that are disposed between the first array substrate 01 and the cover plate 02. The liquid crystal light-control panel 00 has a plurality of light control regions 0a arranged in arrays.

In some practices, in order to ensure the uniformity of alignment between the first array substrate 01 and the cover plate 02, it is necessary to distribute a number of support pillars 03 in each light control region 0a. For example, six support pillars 03 are arranged in each light control region 0a, and thus 12 support pillars 03 need to be arranged in two adjacent light control regions 0a.

However, since the support pillar 03 is generally made of a transparent material, light exiting from the light control region 0a is capable of partially passing through the support pillar 03. This part of light is refracted when passing through the support pillar 03, and thus is changed in an exit direction, resulting in a poor light modulation effect of the liquid crystal light-control panel 00. Therefore, in order to shield this part of light, it is necessary to provide light-shielding blocks 021 in the cover plate 02 in one-to-one correspondence with the plurality of support pillars 03, and it is also necessary to ensure that an orthographic projection of each support pillar 03 onto the first array substrate 01 is within an orthographic projection of the corresponding light-shielding block 021 onto the corresponding first array substrate 01.

However, since a large number of support pillars 03 are arranged in the current liquid crystal light-control panel, a large number of light-shielding blocks 021 are also arranged in the cover plate 02. The light passing through the first array substrate 01 is transmittable from a region in the cover plate 02 where no light-shielding block 021 is provided, but is untransmittable from a region in the cover plate 02 where the light-shielding block 021 is provided. Therefore, in the case that a large number of light-shielding blocks 021 are also arranged in the cover plate 02, the liquid crystal light-control panel 00 has a low light transmittance, which in turn leads to a poor display effect of a display device integrated with such a liquid crystal light-control panel 00.

Figure 3:
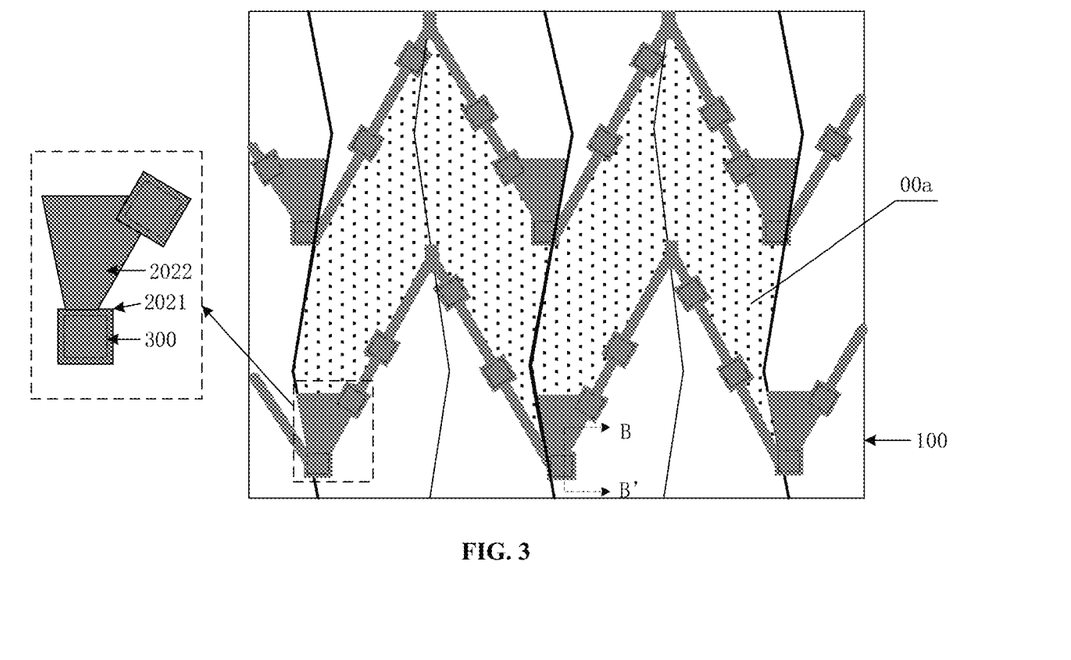
FIG. 3 is a top view of a liquid crystal light-control panel according to some embodiments of the present disclosure.
Figure 4:
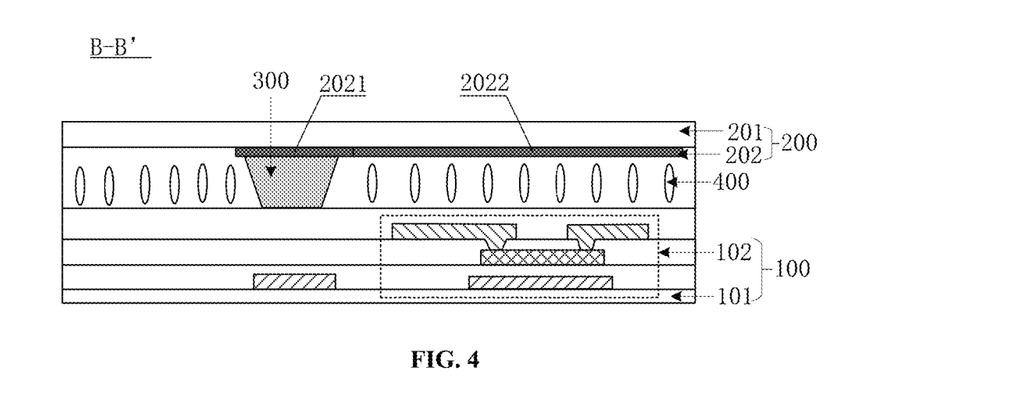
FIG. 4 is a sectional view of the liquid crystal light-control panel shown in FIG. 3 at B-B'.

Referring to FIG. 3 and FIG. 4, in which FIG. 3 is a top view of a liquid crystal light-control panel according to some embodiments of the present disclosure, and FIG. 4 is a sectional view of the liquid crystal light-control panel shown in FIG. 3 at B-B', a liquid crystal light-control panel 000 includes a first array substrate 100 and a cover plate 200 arranged opposite to each other, and a plurality of support pillars 03 disposed between the first array substrate 100 and the cover plate 200.

The first array substrate 100 in the liquid crystal light-control panel 000 includes a first substrate 101 and a plurality of transistors 102 disposed on the first substrate 101. Herein, the plurality of transistors 102 in the first array substrate 100 are all disposed on a side, proximal to the cover plate 200, of the first substrate 101. The liquid crystal light-control panel 000 has a plurality of light control regions 00a arranged in arrays. The plurality of light control regions 00a are in one-to-one correspondence with the plurality of transistors 102. Each of the transistors 102 is disposed within the corresponding light control region 00a.

The cover plate 200 in the liquid crystal light-control panel 000 includes a second substrate 201 and a light-shielding layer 202 disposed on the second substrate 201. Herein, the light-shielding layer 202 in the cover plate 200 is disposed on a side, proximal to the first array substrate 100, of the second substrate 201. The light-shielding layer 202 is provided with a plurality of first light-shielding blocks 2021 in one-to-one correspondence with the plurality of support pillars 300, and a plurality of second light-shielding blocks 2022 in one-to-one correspondence with the plurality of transistors 102.

An orthographic projection of the support pillar 300 onto the first substrate 101 is within an orthographic projection of the corresponding first light-shielding block 2021 onto the first substrate 101, such that the first light-shielding block 2021 is capable of shielding light passing through the first array substrate 100 and travelling toward the support pillar 300. In this way, the light modulation effect of the liquid crystal light-control panel 000 is improved by covering the support pillar 300 with the first light-shielding block 2021. An orthographic projection of the transistor 102 onto the first substrate 101 is within an orthographic projection of the corresponding second light-shielding block 2022 onto the first substrate 101, such that the second light-shielding block 2022 is capable of shielding light passing through the first array substrate 100 and travelling toward the transistor 102. Thus, the light modulation effect of the liquid crystal light-control panel 000 is improved by covering the transistor 102 with the second light-shielding block 2022.

In the present disclosure, a side face of one second light-shielding block 2022 is attached to a side face of at least one first light-shielding block 2021. That is, a partial boundary of an orthographic projection of the second light-shielding block 2022 onto the first substrate 101 is overlapped with a partial boundary of an orthographic projection of at least one first light-shielding block 2021 onto the first substrate 101.

It should be noted that the liquid crystal light-control panel 000 further includes a first liquid crystal layer 400 disposed between the first array substrate 100 and the cover plate 200. The plurality of support pillars 300 ensures the uniformity of alignment between the first array substrate 100 and the cover plate 200, and further ensures that the first liquid crystal layer 400 is evenly distributed between the first array substrate 100 and the cover plate 200. The higher the uniformity of the first liquid crystal layer 400 is, the more uniform the light modulation effect of the plurality of light control regions 00a is. Thus, the liquid crystal light-control panel 000 achieves a better light modulation effect.

In some embodiments of the present disclosure, in the case that the side face of one second light-shielding block 2022 is overlapped with the side face of at least one first light-shielding block 2021, a shared support pillar 300 is arranged between two adjacent light control regions 00a. For example, the support pillar 300a is used as not only the support pillar 300 in the light control region 00a at a left side of the support pillar 300a but also the support pillar 300 in the light control region 00a at a right side of the support pillar 300a. In this way, the total number of support pillars 300 in the two adjacent light control regions 00a is reduced on the premise of keeping the number of support pillars 300 in each light control region 00a unchanged. Correspondingly, the total number of first light-shielding blocks 2021 in the two adjacent light-control regions 00a is also be reduced. For example, still six support pillars 300 are arranged in each light control region 00a. However, the total number of support pillars 300 in the two adjacent light-control regions 00a is 11. Correspondingly, the total number of first light-shielding blocks 2021 in the two adjacent light control areas 00a is also 11. In this way, the number of first light-shielding blocks 2021 in the cover plate 200 is effectively reduced, such that an area of an orthographic projection of the light-shielding layer 202 onto the second substrate 201 is less, which in turn causes a high aperture ratio and high light transmittance of the liquid crystal light-control panel 000. Thus, the display effect of the display device integrated with the liquid crystal light-control panel is improved.

In summary, the embodiments of the present disclosure provide a liquid crystal light-control panel, including a first array substrate, a cover plate and a plurality of support pillars. The first array substrate includes a first substrate and a plurality of transistors. The cover plate includes a second substrate and a light-shielding layer. In the case that a side face of one second light-shielding block is overlapped with a side face of at least one first light-shielding block, a shared support pillar is arranged between two adjacent light control regions. In this way, the total number of support pillars in the two adjacent light control regions is reduced on the premise of remaining the number of support pillars in each light control region unchanged. Correspondingly, the total number of first light-shielding blocks in the two adjacent light control regions is also be reduced. Therefore, the number of first light-shielding blocks arranged in the cover plate is effectively reduced, making an orthographic projection of the light-shielding layer onto the second substrate have a small area, which in turn causes a high aperture ratio and high light transmittance of the liquid crystal light-control panel. Thus, the display effect of the display device integrated with the liquid crystal light-control panel is improved.

Figure 5:
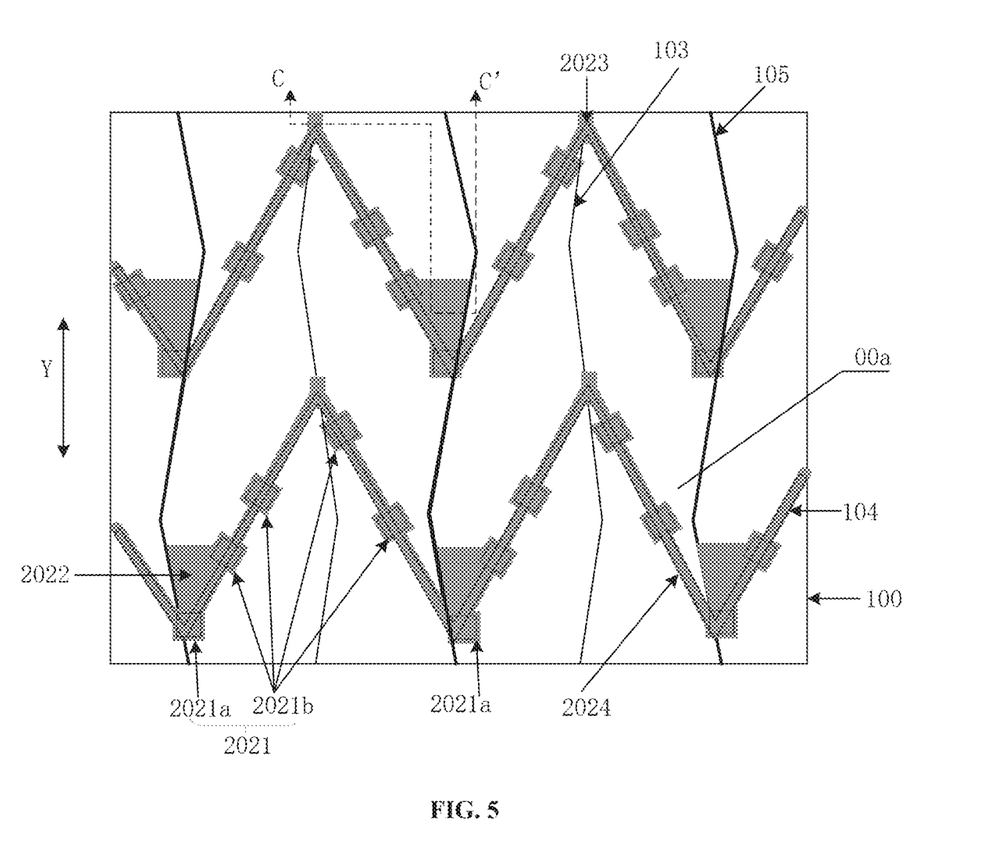
FIG. 5 is a top view of another liquid crystal light-control panel according to some embodiments of the present disclosure.

In some embodiments of the present disclosure, referring to FIG. 5, which is a top view of another liquid crystal light-control panel according to some embodiments of the present disclosure, the plurality of support pillars 300 in the liquid crystal light-control panel 000 are arranged in multiple rows. Since the plurality of first light-shielding blocks 2021 in the cover plate 200 are in one-to-one correspondence with the plurality of support pillars 300, the plurality of first light-shielding blocks 2021 are also arranged in multiple rows, and the multiple rows of first light-shielding blocks 2021 are in one-to-one correspondence with the multiple rows of support pillars 300. Moreover, since the plurality of transistors 102 in the first array substrate 100 are arranged in arrays in multiple rows, and the second light-shielding blocks 2022 in the cover plate 200 are in one-to-one correspondence with the transistors 102, the plurality of second light-shielding blocks 2022 are also arranged in multiple rows, and the multiple rows of second light-shielding blocks 2022 are in one-to-one correspondence with the multiple rows of transistors 102.

It should be noted that in FIG. 5, the row of support pillars 300 are not arranged in arrays on a straight line, but are arranged in arrays in a zigzag pattern. Correspondingly, the row of first light-shielding blocks 2021 are also arranged in arrays in a zigzag pattern.

It should also be noted that in FIG. 5, the row of transistors 102 are arranged in arrays in a straight line, and correspondingly, the row of second light-shielding blocks 2022 are also arranged in arrays in a straight line.

In the present disclosure, the row of first light-shielding blocks 2021 corresponding to the row of support pillars 300 includes a plurality of main light-shielding blocks 2021a and a plurality of auxiliary light-shielding blocks 2021b. The plurality of main light-shielding blocks 2021a are in one-to-one correspondence with the plurality of second light-shielding blocks 2022 in the row of second light-shielding blocks 2022. A side face of the main light-shielding block 2021a is attached to a side face of the corresponding second light-shielding block 2022. In the row of first light-shielding blocks 2021, at least one auxiliary light-shielding block 2021b is arranged between two adjacent main light-shielding blocks 2021a. A side face of the second light-shielding block 2022 may or may not be attached to a side face of the auxiliary light-shielding block 2021b. Optionally, the side face of the second light-shielding block 2022 is attached to the side face of at least one auxiliary light-shielding block 2021b.

In the case that the side face of the second light-shielding block 2022 is attached to the side face of one auxiliary light-shielding block 2021b, the side face of one second light-shielding block 2022 is overlapped with not only the side face of the main light-shielding block 2021a, but also the side face of the auxiliary light-shielding block 2021b, i.e., the side face of one second light-shielding block 2022 is overlapped with the side faces of two first light-shielding blocks 2021. Therefore, the area of the orthographic projection of the light-shielding layer 202 onto the second substrate 201 is further reduced to further improve the aperture ratio and the light transmittance of the liquid crystal light-control panel 000.

In some embodiments of the present disclosure, as shown in FIG. 5, in the row of first light-shielding blocks 2021, the same number of auxiliary light-shielding blocks 2021b are arranged between every two adjacent main light-shielding blocks 2021a. For example, four auxiliary light-shielding blocks 2021b are arranged between every two adjacent main light-shielding blocks 2021a.

Since the plurality of first light-shielding blocks 2021 are in one-to-one correspondence with the plurality of support pillars 300, in the case that the same number of auxiliary light-shielding blocks 2021b are arranged between every two adjacent main light-shielding blocks 2021a, the same number of support pillars 300 are arranged between the two adjacent support pillars 300 corresponding to the two adjacent main light-shielding blocks 2021a. In this way, all the regions of the liquid crystal light-control panel 000 are supported by the support pillar 300 with a similar force, such that the uniformity of the first liquid crystal layer 400 is further ensured and the light modulation effect of the liquid crystal light-control panel 000 is improved.

Optionally, in the case that at least two auxiliary light-shielding blocks 2021b are arranged between two adjacent main light-shielding blocks 2021a in a row of first light-shielding blocks 2021, in the at least two auxiliary light-shielding blocks 2021b, a center-to-center distance between any two auxiliary light-shielding blocks 2021b in a target direction Y is greater than 0. The target direction Y is perpendicular to an overall arrangement direction of the row of first light-shielding blocks 2021.

In this case, the at least two auxiliary light-shielding blocks 2021b arranged between the two adjacent main light-shielding blocks 2021a are not disposed on the same straight line perpendicular to the target direction Y. In this way, it is possible to avoid an undesirable phenomenon of rainbow patterns on the liquid crystal light-control panel 000, caused by the reason that the plurality of auxiliary light-shielding blocks 2021b are disposed on the same straight line. Thus, the light modulation effect of the display device integrated with the liquid crystal light-control panel 000 is further improved.

Figure 6:
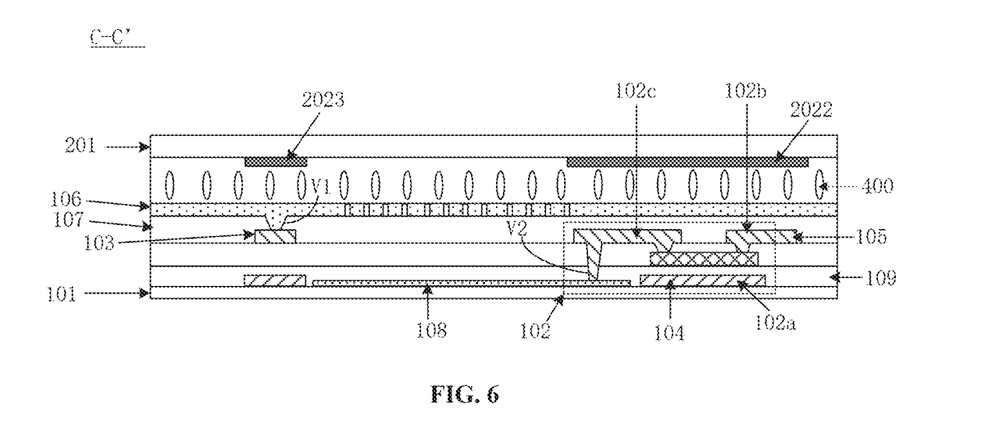
FIG. 6 is a sectional view of the liquid crystal light-control panel shown in FIG. 5 at C-C'.

In the present disclosure, referring to FIG. 5 and FIG. 6, FIG. 6 is a sectional view of the liquid crystal light-control panel shown in FIG. 5 at C-C', the first array substrate 100 further includes a common signal line 103 disposed on the first substrate 101 and a common electrode layer 106 disposed on sides, distal from the first substrate 102, of the plurality of transistors 102. A plurality of first via holes V1 are arranged in the first array substrate 100. The common electrode layer 106 is electrically connected to a plurality of common signal lines 103 via the plurality of first via holes V1. Exemplarily, the first array substrate 100 further includes a planarization layer 107 disposed between the plurality of transistors 102 and the common electrode layer 106. A plurality of first via holes V1 are arranged in the planarization layer 107.

The light-shielding layer 202 is further provided with a plurality of third light-shielding blocks 2023 in one-to-one correspondence with the plurality of first via holes V1. An orthographic projection of the first via hole V1 onto the first substrate 101 is within an orthographic projection of the corresponding third light-shielding block 2023 onto the first substrate 101.

In this case, the common electrode layer 106 needs to be electrically connected to a plurality of common signal lines 103 via a plurality of first via holes V1. Therefore, the common electrode layer 106 needs to be partially disposed in the first via hole V1, i.e., the first via hole V1 is filled with a conductive material. In this way, in the case that the liquid crystal light-control panel 000 applies an electric field to control liquid crystals in the first liquid crystal layer 400 to deflect, the conductive material with which the first via hole V1 is filled affects distribution of the electric field at the first via hole V1, which in turn affects an angle of deflection of the liquid crystals at the first via hole V1. As a result, the light intensity of the light passing through the first via hole V1 is different from that of the light passing through portions other than the first via hole V1, which in turn leads to nonuniform distribution of luminance presented by the liquid crystal light-control panel 000. However, in the case that the first via hole V1 is covered with the third light-shielding block 2023, the light passing through the first via hole V1 is prevented from exiting the cover plate 200, thereby effectively improving the uniformity of the luminance distribution presented by the liquid crystal light-control panel 000.

Optionally, as shown in FIG. 5, the first array substrate 100 further includes a plurality of first gate lines 104 and a plurality of first data signal lines 105 disposed on the first substrate 101. An overall extension direction of the first gate line 104 is intersected with that of the first data signal lines 105. The plurality of first gate lines 104 and the plurality of first data signal lines 105 are enclosed to form a plurality of light control regions 00a. For example, two adjacent first gate lines 104 and two adjacent first data signal lines 105 are enclosed to form one light control region 00a.

In the present disclosure, one of the first gate lines 104 is electrically connected to a gate 102a of each transistor 102 in a row of transistors 102, and one of the first data signal lines 105 is electrically connected to a first electrode 102b of each transistor 102 in a column of transistors 102.

The common signal line 103 and the first data signal line 105 are arranged in the same layer and made of the same material, i.e., the common signal line 103 and the first data signal line 105 are formed by the same time of a patterning process. In the present disclosure, the extension direction of the first data signal line 105 is parallel to that of the common signal line 103.

Orthographic projections of the plurality of first gate lines 104 onto the first substrate 101 are all within an orthographic projection of the light-shielding layer 202 onto the first substrate 101. In the present disclosure, the first gate line 104 is made of a metal material, for example, copper. In addition, the first gate line 104 is large in width and thus has high reflectivity to the light travelling toward the first gate line 104 in the liquid crystal light-control panel 000, which in turn affects the display effect of the liquid crystal light-control panel 000. However, in the case that the orthographic projections of the plurality of first gate lines 104 onto the first substrate 101 are all within the orthographic projection of the light-shielding layer 202 onto the first substrate 101, the light travelling toward the first gate lines 104 is shielded by the light-shielding layer 202, thereby improving the display effect of the liquid crystal light-control panel 000.

Exemplarily, the light-shielding layer 202 is further provided with a light-shielding line segment 2024. An orthographic projection of the first gate line 104 onto the first substrate 101 is within an orthographic projection of the light-shielding line segment 2024 onto the first substrate 101. Optionally, a width of the light-shielding line segment 2024 is equal to that of the first gate line 104. In this way, a boundary of the orthographic projection of the first gate line 104 onto the first substrate 101 is overlapped with a boundary of the orthographic projection of the light-shielding line segment 2024 onto the first substrate 101, such that the light-shielding line segment 2024 exactly covers the first gate line 104. In this way, the area of the orthographic projection of the light-shielding layer 202 onto the second substrate 201 is further reduced on the premise of ensuring that the light-shielding line segment 2024 effectively covers the first gate line 104.

It should be noted that the common signal line 103 and the first data signal line 105 are usually made of metal materials. However, the common signal line 103 and the first data signal line 105 generally have small widths, and thus have low light reflectivity. The light-shielding layer 202 in the cover plate 200 fail to cover the common signal line 103 or the first data signal line 105.

Figure 7:
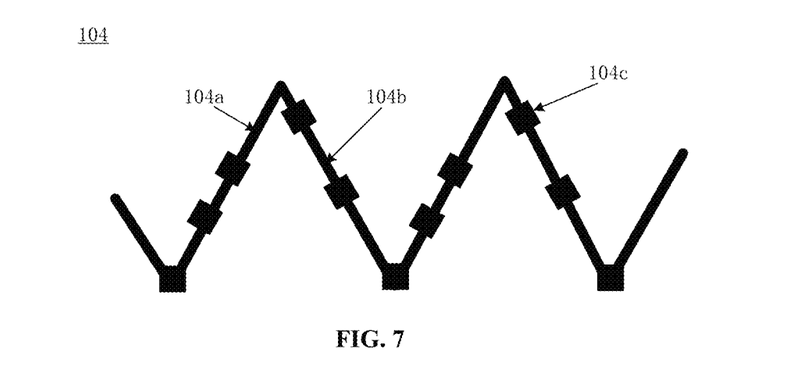
FIG. 7 is a schematic structural diagram of a gate line according to some embodiments of the present disclosure.

Optionally, referring to FIG. 7, which is a schematic structural diagram of a gate line according to some embodiments of the present disclosure, the first gate line 104 includes a plurality of first sub-gate lines 104a and a plurality of second sub-gate lines 104b. The plurality of first sub-gate lines 104a and the plurality of second sub-gate lines 104b are alternately distributed. A first end of the first sub-gate line 104a is connected to a first end of the second sub-gate line 104b. A second end of the first sub-gate line 104a is connected to a second end of the second sub-gate line 104b. An extension direction of the first sub-gate line 104a is intersected with that of the second sub-gate line 104b.

Herein, by alternately distributing the plurality of first sub-gate lines 104a and the plurality of second sub-gate lines 104a, the first gate lines 104 are distributed in a zigzag pattern. In this way, a light control region 100a surrounded by two adjacent first gate lines 104 and two adjacent first data signal lines 105 is in an arrow-like shape. However, a sub-pixel region in an LCD panel is usually rectangular. Therefore, in the case that the liquid crystal light-control panel 000 in the present disclosure and the LCD panel are assembled into a display device, the shape of the light control region 00a in the liquid crystal light-control panel 000 is different from that of the sub-pixel region in the LCD panel, such that the display device is prevented from rainbow patterns. Therefore, the display effect of the display device is improved.

In the present disclosure, an orthographic projection of a portion where the first end of the first sub-gate line 104a and the first end of the second sub-gate line 104a are connected onto the first substrate 101 is overlapped with an orthographic projection of the first light-shielding block 2021 onto the first substrate; and an orthographic projection of a portion where the second end of the first sub-gate line 104a and the second end of the second sub-gate line 104a are connected onto the first substrate 101 is overlapped with an orthographic projection of the third light-shielding block 2023 onto the first substrate.

Exemplarily, as shown in FIG. 5, the orthographic projection of the portion where the first where the first end of the first sub-gate line 104a and the first end of the second sub-gate line 104b are connected onto the first substrate 101 is overlapped with orthographic projections of the main light-shielding blocks 2021a in a row of first light-shielding blocks 2021 onto the first substrate 101. However, orthographic projections of the auxiliary light-shielding blocks 2021b in a row of first light-shielding blocks 2021 onto the first substrate 101 are overlapped with the orthographic projection of the first sub-gate line 104a onto the first substrate 101, or overlapped with the orthographic projection of the second sub-gate line 104a onto the first substrate 101.

In this case, a plurality of rows of first light-shielding blocks 2021 are in one-to-one correspondence with a plurality of first gate lines 104, such that a plurality of rows of support pillars 300 are also in one-to-one correspondence with a plurality of first gate lines 104. In this way, each row of support pillars 300 is supported by the corresponding first gate line 104. Thus, the support pillars 300 supported by the first gate line 104 are improved in terms of stability in supporting the first array substrate 100 and the cover plate 200 arranged opposite to each other. In addition, the way in which each row of support pillars 300 are arranged is related to a structural shape of the corresponding first gate line 104. In the case that the first gate lines 104 are distributed in a zigzag pattern, the row of support pillars 300 corresponding to the first gate line 104 are also arranged in arrays in a zigzag pattern.

Optionally, as shown in FIG. 7, the first gate line 104 is provided with a plurality of bumps 104c in one-to-one correspondence with a plurality of support pillars 300 in the corresponding row of support pillars 300, and orthographic projections of the bumps 104c onto the first substrate 101 are within orthographic projections of the corresponding support pillars 300 onto the first substrate 100. Exemplarily, the support pillar 300 is a frustum-shaped support pillar. A bottom surface, proximal to the first array substrate 100, of the frustum-shaped support pillar has a smaller area than a bottom surface, proximal to the second array substrate 100, of the frustum-shaped support pillar. At this time, even in the case that the orthographic projection of the bump 104c onto the first substrate 101 is within the orthographic projection of the corresponding support pillar 300 onto the first substrate 100, the support pillar 300 is also supported by the bump 104c.

In this case, since the support pillar 300 is supported by the bump 104c, the stability of the support pillar 300 is improved, which in turn further ensures the uniformity of alignment between the first array substrate 100 and the cover plate 200.

Exemplarily, the orthographic projection of the portion where the first end of the first sub-gate line 104a and the first end of the second sub-gate line 104a are connected onto the first substrate 101 is overlapped with the orthographic projection of the main light-shielding block 2021a in a row of first light-shielding blocks 2021 onto the first substrate 101. Therefore, it is necessary to provide one bump 104c at a portion where the first end of the first sub-gate line 104a and the first end of the second sub-gate line 104a are connected.

Likewise, the orthographic projection of the auxiliary light-shielding block 2021b in a row of first light-shielding blocks 2021 onto the first substrate 101 is overlapped with the orthographic projection of the first sub-gate line 104a onto the first substrate 101, or overlapped with the orthographic projection of the second sub-gate line 104a onto the first substrate 101. Therefore, both of the first sub-gate line 104a and the second sub-gate line 104a need to be provided with at least one bump 104c.

Optionally, two or more bumps 104c are distributed on each of the first sub-gate line 104a and the second sub-gate line 104b. In this case, on both of the first sub-gate line 104a and the second sub-gate line 104b, the number of support pillars 300 corresponding to the bumps 104c is greater than or equal to 2. In the case that the number of support pillars 300 is greater than or equal to 2, the regularity of light emitted from the liquid crystal light-control panel 000 is effectively interfered, and thus the probability of moire patterns due to the high regularity of the emitted light is reduced.

In the present disclosure, the area of the orthographic projection of the first light-shielding block 2021 onto the first substrate 101 is equal to that of the orthographic projection of the corresponding support pillar 300 onto the first substrate 101. In this way, the boundary of the orthographic projection of the first light-shielding block 2021 onto the first substrate 101 is overlapped with the boundary of the orthographic projection of the corresponding support pillar 300 onto the first substrate 101, such that the first light-shielding block 2021 exactly covers the support pillar 300. Therefore, the area of the orthographic projection of the light-shielding layer 202 onto the second substrate 201 is further reduced on the premise of ensuring that the first light-shielding block 2021 effectively covers the support pillar 300.

Figure 8:
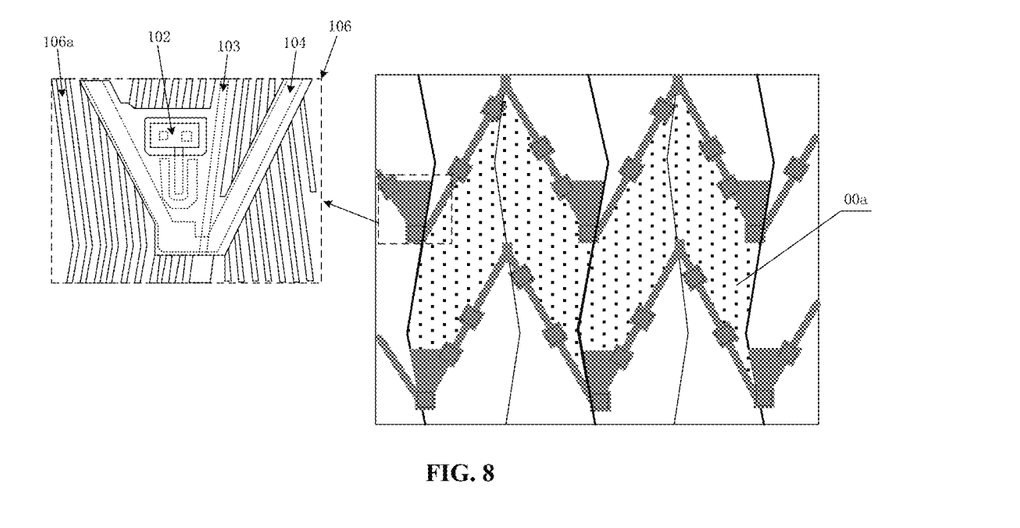
FIG. 8 is a top view of yet another liquid crystal light-control panel according to some embodiments of the present disclosure.

In some embodiments of the present disclosure, referring to FIG. 8, which is a top view of yet another liquid crystal light-control panel according to some embodiments of the present disclosure, the orthographic projections of the plurality of transistors 102 onto the first substrate 101 and the orthographic projections of the plurality of first gate lines 104 onto the first substrate 101 are both within the orthographic projection of the common electrode layer 106 onto the substrate.

In this case, an external electric field is shielded by the common electrode layer 106 and thus prevented from interfering with signals in the plurality of first gate lines 104 and signals in the transistors 102, such that the electrical stability of the liquid crystal light-control panel 000 is improved. Further, in some embodiments of the present disclosure, since the side face of one second light-shielding block 2022 is overlapped with the side face of at least one first light-shielding block 2021, the total number of support pillars 300 is reduced. Moreover, the plurality of bumps 104c in the first gate line 104 are in one-to-one correspondence with the plurality of support pillars 300, such that the number of bumps 104c in the first gate line 104 is also reduced. In this way, an area of overlapping between the first gate line 104 and the common electrode layer 106 is also reduced, thereby effectively reducing parasitic capacitance between the common electrode layer 106 and the first gate line 104 and further improving the electrical stability of the liquid crystal light-control panel 000.

In the present disclosure, as shown in FIG. 8, the common electrode layer 106 has a plurality of slits 106a, and orthographic projections of the plurality of slits 106a onto the first substrate 101 are overlapped with neither the orthographic projections of the plurality of transistors 102 onto the first substrate 101 nor the orthographic projections of the plurality of first gate lines 104 onto the first substrate 101. In this way, a portion of the common electrode layer 106 where no slit 106a is present covers the plurality of transistors 102 and the plurality of first gate lines 104. However, the portion of the common electrode layer 106 where no slit 106a is present better shields the external electric field, thereby preventing the external electric field from interfering with signals in the plurality of first gate lines 104 and signals in the plurality of transistors 102. Further, in the case that the side face of one second light-shielding block 2022 is overlapped with the side face of at least one first light-shielding block 2021, the total number of support pillars 300 is reduced. However, the plurality of bumps 104c in the first gate line 104 are in one-to-one correspondence with the plurality of support pillars 300. In this way, the area of the orthographic projection of the first gate line onto the first substrate 101 is effectively reduced, such that the area of an orthographic projection of a portion of the common electrode layer 106 covering the first gate line 104 (i.e., the portion of the common electrode layer 106 where no slit 106a is provided) onto the first substrate 101 can also be reduced, while the overall area of the side of the first array substrate 100 facing the second array substrate 200 remains unchanged. Therefore, the area of an orthographic projection of a portion of the common electrode layer 106 where the slits 106a are provided onto the first substrate 101 is increased, such that the aperture ratio and the light transmittance of the liquid crystal light-control panel 000 is improved.

Optionally, continuing to refer to FIG. 6, the first array substrate 100 further includes a plurality of pixel electrodes 108 in one-to-one correspondence with the plurality of transistors 102, and a second electrode 102c of the transistor 102 is electrically connected to the corresponding pixel electrode 108. An overlapping region is present between an orthographic projection of the pixel electrode 108 onto the first substrate 101 and the orthographic projection of the common signal line 103 onto the first substrate 101. In this way, a storage capacitor is formed between the pixel electrode 108 and the common signal line 103.

In the present disclosure, the pixel electrode 108 and the first gate line 104 are arranged in the same layer but made of different materials. That is, the pixel electrode 108 and the first gate line 104 are formed by two patterning processes. One patterning process is to form a conductive layer where the pixel electrode 108 is disposed, and the other patterning process is to form a conductive layer where the first gate line 104 is disposed. The pixel electrode 108 is made of a transparent conductive material, for example, indium tin oxide. The first gate line 104 is made of a metal, for example, copper. The light transmittance of the liquid crystal light control-panel is improved in the case that the pixel electrode 108 is made of a transparent conductive material. In the present disclosure, by arranging the pixel electrode 108 and the first gate line 104 in the same layer, the number of conductive layers in the liquid crystal light-control panel 000 is effectively reduced, such that the thickness of the liquid crystal light-control panel 000 is small, and further the thickness of the display device integrated with the liquid crystal light-control panel 000 is reduced.

Optionally, still referring to FIG. 6, the first array substrate 100 further includes a gate insulating layer 109. The gate electrode 102a of the transistor 102 is disposed on a side, proximal to the first substrate 101, of the gate insulating layer 109. A first electrode 102b and a second electrode 102c of the transistor 102 are disposed on a side, distal from the first substrate 101, of the gate insulating layer 109.

A plurality of second via holes V2 in one-to-one correspondence with the plurality of transistors 102 are arranged in the gate insulating layer 109. The second electrode 102c of the transistor 102 is electrically connected to the corresponding pixel electrode 108 via the corresponding second via hole V2.

In summary, the embodiments of the present disclosure provide a liquid crystal light-control panel, including a first array substrate, a cover plate and a plurality of support pillars. The first array substrate includes a first substrate and a plurality of transistors. The cover plate includes a second substrate and a light-shielding layer. In the case that a side face of one second light-shielding block is overlapped with a side face of at least one first light-shielding block, a shared support pillar is arranged between two adjacent light control regions. In this way, the total number of support pillars in the two adjacent light control regions is reduced on the premise of remaining the number of support pillars in each light control region unchanged. Correspondingly, the total number of the first light-shielding blocks in the two adjacent light control regions can also be reduced. Therefore, the number of first light-shielding blocks arranged in the cover plate is effectively reduced, making an orthographic projection of the light-shielding layer onto the second substrate have a small area, which in turn causes high light transmittance of the liquid crystal light-control panel. Thus, the display effect of the display device integrated with the liquid crystal light-control panel is improved.

Figure 9:
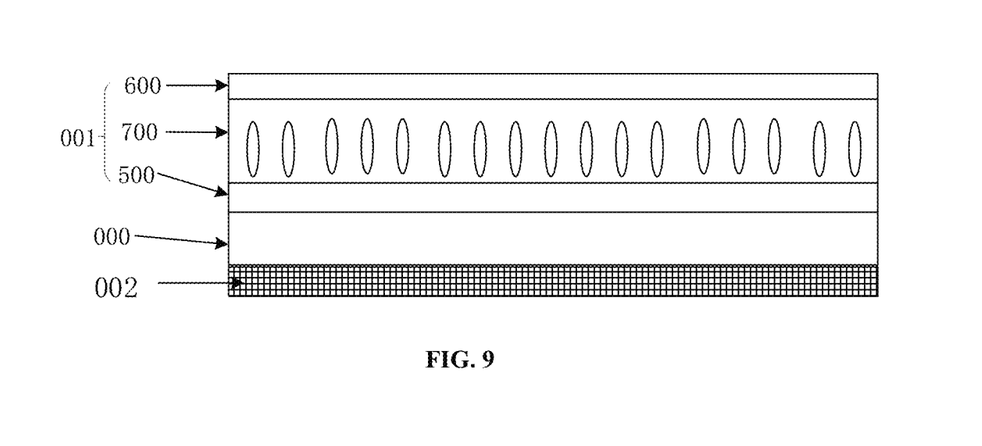
FIG. 9 is a schematic diagram of a display device according to some embodiments of the present disclosure.

Referring to FIG. 9, which is a schematic diagram of a display device according to some embodiments of the present disclosure, the display device includes a liquid crystal light-control panel 000 and an LCD panel 001 that are stacked up. The liquid crystal light-control panel 000 is the liquid crystal light-control panel 000 described above. The display device is any product or component having a display function, such as a display, a mobile phone, a tablet computer, a TV, a notebook computer, a digital photo frame or a navigator.

The LCD panel 001 includes a second array substrate 500 and a color film substrate 600 arranged opposite to each other, and a second liquid crystal layer 700 disposed between the second array substrate 500 and the color film substrate 600. The second array substrate 500 includes a third substrate, and a plurality of second gate lines and a plurality of second data signal lines disposed on the third substrate. The plurality of second gate lines and the plurality of second data signal lines are enclosed to form a plurality of sub-pixel regions. For example, two adjacent second gate lines and two adjacent second data signal lines are enclosed to form one sub-pixel region.

Optionally, the liquid crystal light-control panel 000 has a plurality of light control regions 00a arranged in arrays, the LCD panel 001 has a plurality of sub-pixel regions arranged in arrays, and the light control regions 00a and the sub-pixel regions are in different shapes. In this way, the display device is prevented from an undesirable phenomenon of rainbow patterns. Thus, the display effect of the display device is improved.

Continuing to refer to FIG. 9, the display device further includes a backlight module 002 disposed on a side, distal from the LCD panel 001, of the LCD panel 000. Light emitted from the backlight module 002 passes through the liquid crystal light-control panel 000 and enters the LCD panel 001. The LCD panel 001 is capable of adjusting the color and the brightness of the light exiting from each sub-pixel region to display various pictures. The liquid crystal light-control panel 00 is capable of adjusting the brightness of the light exiting from each light control region 00a to improve the contrast ratio of the picture displayed by the LCD panel 001. Therefore, the display effect of the liquid crystal display panel 001 is improved.

It should be noted that in the accompanying drawings, for clarity of the illustration, the dimensions of the layers and the regions may be scaled up. Further, it is understood that where an element or layer is described as being "above" another element or layer, the described element or layer may be directly on the other element, or there may be an intermediate layer. In addition, it is understood that where an element or layer is described as being "below" another element or layer, the described element or layer may be directly under the other element, or there may be at least one intermediate layer or element. Moreover, it is further understood that where a layer or element is described as being arranged "between" two layers or elements, the described layer or element may be the exclusive one between the two layers or elements, or there may be at least one intermediate layer or element. Similar reference numerals refer to similar elements throughout the whole text.

In the present disclosure, the terms "first" and "second" are used for descriptive purposes only and are not to be construed as indicating or implying relative importance. The term "plurality" refers to two or more, unless specifically defined otherwise.

Described above are merely optional embodiments of the present disclosure, and are not intended to limit the present disclosure. Any modifications, equivalent substitutions, improvements and the like made within the spirit and principles of the present disclosure should be included within the scope of protection of the present disclosure.

What is claimed is:

1. A liquid crystal light-control panel, comprising: a first array substrate and a cover plate that are opposite to each other, and a plurality of support pillars disposed between the first array substrate and the cover plate;
wherein the first array substrate comprises a first substrate and a plurality of transistors disposed on the first substrate, wherein an orthographic projection of the support pillar onto the first substrate is not overlapped with an orthographic projection of the transistor onto the first substrate; and the cover plate comprises a second substrate and a light-shielding layer disposed on the second substrate, the light-shielding layer comprising a plurality of first light-shielding blocks in one-to-one correspondence with the plurality of support pillars and a plurality of second light-shielding blocks in one-to-one correspondence with the plurality of transistors;
wherein the orthographic projection of the support pillar onto the first substrate is within an orthographic projection of the corresponding first light-shielding block onto the first substrate; the orthographic projection of the transistor onto the first substrate is within an orthographic projection of the corresponding second light-shielding block onto the first substrate; and a side face of one of the second light-shielding blocks is attached to side faces of two of the first light-shielding blocks;
wherein the first array substrate further comprises a plurality of first gate lines and a plurality of first data signal lines disposed on the first substrate, wherein centers of the two of the first light-shielding blocks attached to the side face of the second light-shielding block are disposed on one side of one of the plurality of first data signal lines.

2. The liquid crystal light-control panel according to claim 1, wherein the plurality of support pillars are arranged in a plurality of rows, and a row of first light-shielding blocks corresponding to a row of the support pillars comprise a plurality of main light-shielding blocks and a plurality of auxiliary light-shielding blocks; wherein
the plurality of main light-shielding blocks are in one-to-one correspondence with a plurality of second light-shielding blocks in a row of second light-shielding blocks, and a side face of the main light-shielding block is attached to a side face of the corresponding second light-shielding block; and
in a row of the first light-shielding blocks, at least one of the auxiliary light-shielding blocks is arranged between two adjacent ones of the main light-shielding blocks.

3. The liquid crystal light-control panel according to claim 2, wherein in a row of the first light-shielding blocks, a quantity of the auxiliary light-shielding blocks arranged between every two adjacent ones of the main light-shielding blocks is equal.

4. The liquid crystal light-control panel according to claim 2, wherein in the case that at least two auxiliary light-shielding blocks are arranged between two adjacent ones of the main light-shielding blocks in a row of the first light-shielding blocks, in the at least two auxiliary light-shielding blocks, a center-to-center distance between any two auxiliary light-shielding blocks in a target direction is greater than 0, the target direction being perpendicular to an overall arrangement direction of a row of the first light-shielding blocks.

5. The liquid crystal light-control panel according to claim 2, wherein a side face of the second light-shielding block is attached to a side face of at least one of the auxiliary light-shielding blocks.

6. The liquid crystal light-control panel according to claim 1, wherein the first array substrate further comprises a common signal line disposed on the first substrate, and a common electrode layer disposed on sides, distal from the first substrate, of the plurality of transistors; wherein
the first array substrate comprises a plurality of first via holes, and the common electrode layer is electrically connected to the plurality of common signal lines via the plurality of first via holes; and
the light-shielding layer is further provided with a plurality of third light-shielding blocks in one-to-one correspondence with the plurality of first via holes, and an orthographic projection of the first via hole onto the first substrate is within an orthographic projection of the corresponding third light-shielding block onto the first substrate.

7. The liquid crystal light-control panel according to claim 6, wherein one of the first gate lines being electrically connected to a gate electrode of each transistor in a row of transistors, one of the first data signal lines being electrically connected to a first electrode of each transistor in a column of transistors;
wherein the common signal line and the first data signal line are arranged in the same layer and made of the same material, and orthographic projections of the plurality of first gate lines onto the first substrate are all within an orthographic projection of the light-shielding layer onto the first substrate.

8. The liquid crystal light-control panel according to claim 7, wherein the first gate line comprises a plurality of first sub-gate lines and a plurality of second sub-gate lines; the plurality of first sub-gate lines and the plurality of second sub-gate lines are alternately distributed; a first end of the first sub-gate line is connected to a first end of the second sub-gate line; a second end of the first sub-gate line is connected to a second end of the second sub-gate line; and an extension direction of the first sub-gate line is intersected with that of the second sub-gate line.

9. The liquid crystal light-control panel according to claim 8, wherein
an orthographic projection of a portion where the first end of the first sub-gate line and the first end of the second sub-gate line are connected onto the first substrate is overlapped with an orthographic projection of the first light-shielding block onto the first substrate; and an orthographic projection of a portion where the second end of the first sub-gate line and the second end of the second sub-gate line are connected onto the first substrate is overlapped with an orthographic projection of the third light-shielding block onto the first substrate.

10. The liquid crystal light-control panel according to claim 8, wherein the plurality of first gate lines are in one-to-one correspondence with the plurality of rows of support pillars; the first gate line is provided with a plurality of bumps in one-to-one correspondence with a plurality of support pillars in the corresponding row of support pillars; and an orthographic projection of the bump onto the first substrate is within an orthographic projection of the corresponding support pillar onto the first substrate.

11. The liquid crystal light-control panel according to claim 10, wherein a portion where the first end of the first sub-gate line and the first end of the second sub-gate line are connected is provided with one of the bumps, and a quantity of the bumps distributed on each of the first sub-gate line and the second sub-gate line is greater than or equal to 2.

12. The liquid crystal light-control panel according to claim 7, wherein orthographic projections of the plurality of transistors onto the first substrate and orthographic projections of the plurality of first gate lines onto the first substrate are both within an orthographic projection of the common electrode layer onto the substrate.

13. The liquid crystal light-control panel according to claim 12, wherein the common electrode layer has a plurality of slits, and orthographic projections of the plurality of slits onto the first substrate are overlapped with neither orthographic projections of the plurality of transistors onto the first substrate nor orthographic projections of the plurality of first gate lines onto the first substrate.

14. The liquid crystal light-control panel according to claim 7, wherein the first array substrate further comprises a plurality of pixel electrodes in one-to-one correspondence with the plurality of transistors, and a second electrode of the transistor is electrically connected to the corresponding pixel electrode;

an overlapping region exists between an orthographic projection of the pixel electrode onto the first substrate and an orthographic projection of the common signal line onto the first substrate.

15. The liquid crystal light-control panel according to claim 14, wherein the pixel electrode and the first gate line are arranged in the same layer but made of different materials.

16. The liquid crystal light-control panel according to claim 15, wherein the first array substrate further comprises a gate insulating layer; a gate electrode of the transistor is disposed on a side, proximal to the first substrate, of the gate insulating layer; and a first electrode and a second electrode of the transistor are disposed on a side, distal from the first substrate, of the gate insulating layer; and the gate insulating layer comprises a plurality of second via holes in one-to-one correspondence with the transistors, and a second electrode of the transistor is electrically connected to the corresponding pixel electrode via the corresponding second via hole.

17. The liquid crystal light-control panel according to claim 7, wherein the first array substrate further comprises a planarization layer between the plurality of transistors and the common electrode layer, and the plurality of first via holes are arranged in the planarization layer.

18. A display device, comprising: a liquid crystal light-control panel and a liquid crystal display LCD panel that are stacked up;
wherein the liquid crystal light-control panel comprises: a first array substrate and a cover plate that are opposite to each other, and a plurality of support pillars disposed between the first array substrate and the cover plate;
wherein the first array substrate comprises a first substrate and a plurality of transistors disposed on the first substrate, wherein an orthographic projection of the support pillar onto the first substrate is not overlapped with an orthographic projection of the transistor onto the first substrate; and the cover plate comprises a second substrate and a light-shielding layer disposed on the second substrate, the light-shielding layer comprising a plurality of first light-shielding blocks in one-to-one correspondence with the plurality of support pillars and a plurality of second light-shielding blocks in one-to-one correspondence with the plurality of transistors;
wherein the orthographic projection of the support pillar onto the first substrate is within an orthographic projection of the corresponding first light-shielding block onto the first substrate; the orthographic projection of the transistor onto the first substrate is within an orthographic projection of the corresponding second light-shielding block onto the first substrate; and a side face of one of the second light-shielding blocks is attached to side faces of two of the first light-shielding blocks;
wherein the first array substrate further comprises a plurality of first gate lines and a plurality of first data signal lines disposed on the first substrate, wherein centers of the two of the first light-shielding blocks attached to the side face of the second light-shielding block are disposed on one side of one of the plurality of first data signal lines.

19. The display device according to claim 18, wherein the liquid crystal light-control panel has a plurality of light control regions arranged in arrays.

20. The display device according to claim 18, further comprising: a backlight module, wherein the backlight module is disposed on a side, distal from the LCD panel, of the liquid crystal light-control panel.

* * * * *